United States Patent
Dong et al.

(10) Patent No.: US 8,467,648 B2
(45) Date of Patent: *Jun. 18, 2013

(54) ULTRA SMALL CORE FIBER WITH DISPERSION TAILORING

(75) Inventors: Liang Dong, Clemson, SC (US); Brian Thomas, Brighton, MI (US); Libin Fu, Ann Arbor, MI (US)

(73) Assignee: IMRA America, Inc., Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/448,003

(22) Filed: Apr. 16, 2012

(65) Prior Publication Data

US 2012/0314995 A1   Dec. 13, 2012

Related U.S. Application Data

(63) Continuation of application No. 12/407,663, filed on Mar. 19, 2009, now Pat. No. 8,165,441.

(60) Provisional application No. 61/039,717, filed on Mar. 26, 2008.

(51) Int. Cl.
*G02B 6/02* (2006.01)
*G02B 6/036* (2006.01)

(52) U.S. Cl.
USPC ............................ 385/123; 385/125; 385/126

(58) Field of Classification Search
USPC .......................................... 385/123, 125, 126
See application file for complete search history.

(56) References Cited

U.S. PATENT DOCUMENTS

| | | |
|---|---|---|
| 6,444,133 B1 | 9/2002 | Fajardo |
| 6,792,188 B2 | 9/2004 | Libori |
| 6,816,658 B2 | 11/2004 | Bayart et al. |
| 7,266,275 B2 | 9/2007 | Hansen |
| 8,165,441 B2 | 4/2012 | Dong et al. |
| 2004/0052484 A1 | 3/2004 | Broeng et al. |
| 2004/0213302 A1 | 10/2004 | Fermann |
| 2004/0240037 A1 | 12/2004 | Harter |
| 2005/0041945 A1* | 2/2005 | Lee et al. ................. 385/125 |
| 2005/0069269 A1 | 3/2005 | Libori et al. |
| 2005/0226286 A1 | 10/2005 | Liu |
| 2005/0238070 A1 | 10/2005 | Imeshev |
| 2006/0198398 A1 | 9/2006 | Fermann |
| 2008/0240663 A1 | 10/2008 | Dong |
| 2009/0245729 A1 | 10/2009 | Dong et al. |

OTHER PUBLICATIONS

J. Ranka et al., "Optical properties of high-delta air-silica microstructure optical fibers", Optics Letters, vol. 25, No. 11, p. 796-798 (Jun. 1, 2000).
G.P. Agrawal, Nonlinear Fiber Optics, Academic Press, Inc. New York, 1989 p. 81.

* cited by examiner

*Primary Examiner* — Hemang Sanghavi
(74) *Attorney, Agent, or Firm* — Knobbe, Martens, Olson & Bear, LLP

(57) ABSTRACT

Various embodiments of optical fiber designs and fabrication processes for ultra small core fibers (USCF) are disclosed. In some embodiments, the USCF includes a core that is at least partially surrounded by a region comprising first features. The USCF further includes a second region at least partially surrounding the first region. The second region includes second features. In an embodiment, the first features are smaller than the second features, and the second features have a filling fraction greater than about 90 percent. The first features and/or the second features may include air holes. Embodiments of the USCF may provide dispersion tailoring. Embodiments of the USCF may be used with nonlinear optical devices configured to provide, for example, a frequency comb or a supercontinuum.

20 Claims, 17 Drawing Sheets

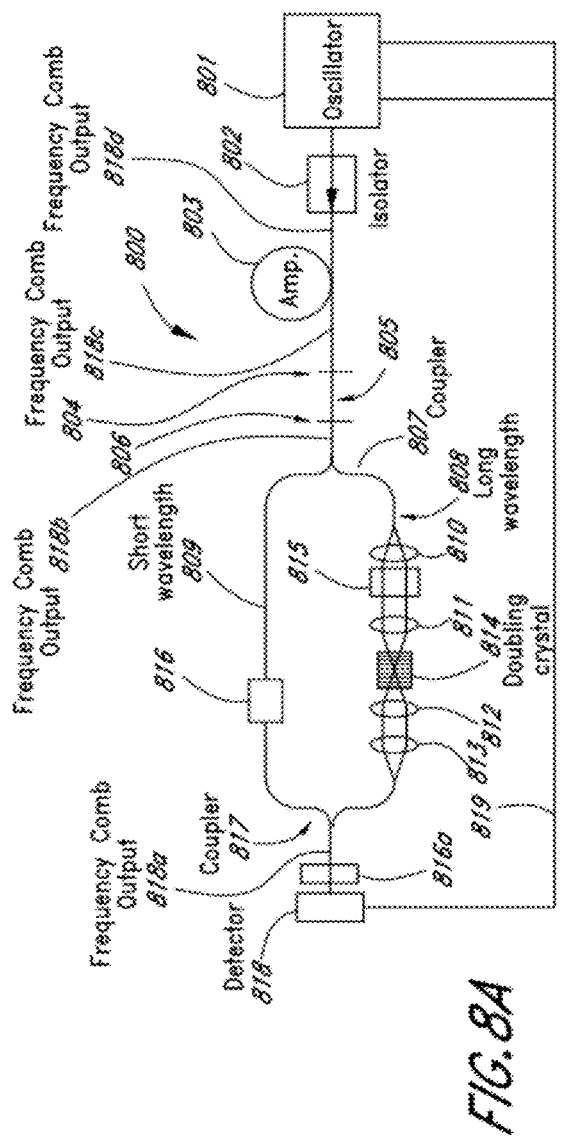
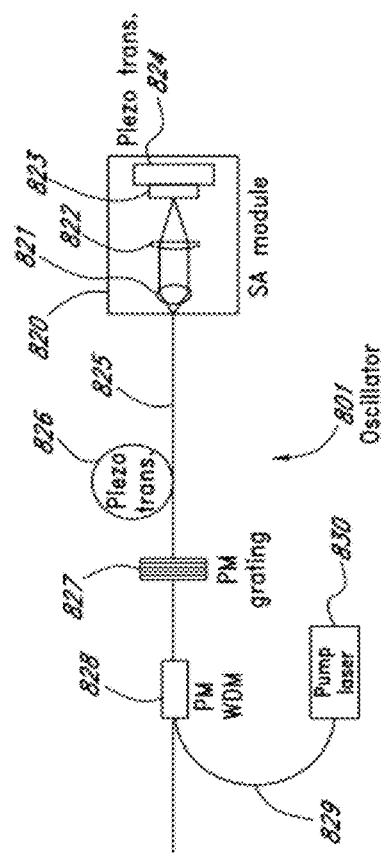
FIG.8A
FIG.8B

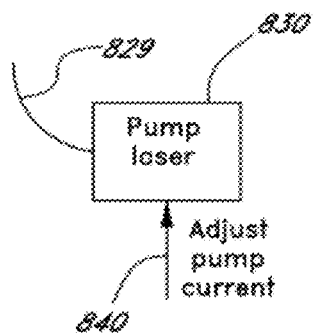
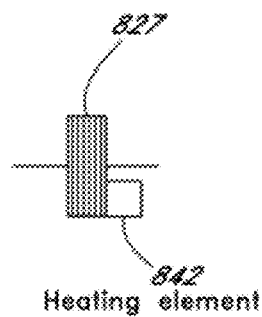
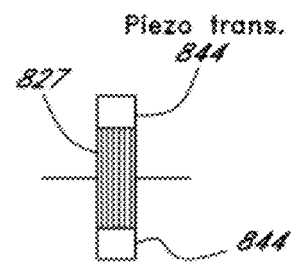
FIG.8C  FIG.8D  FIG.8E
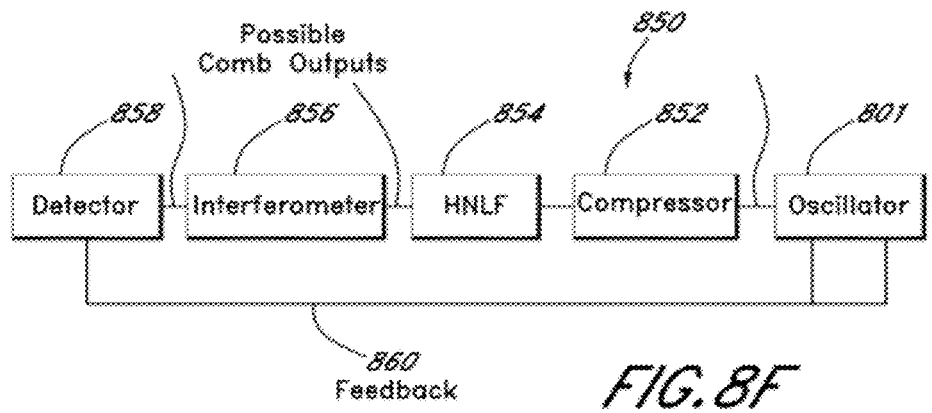
FIG.8F
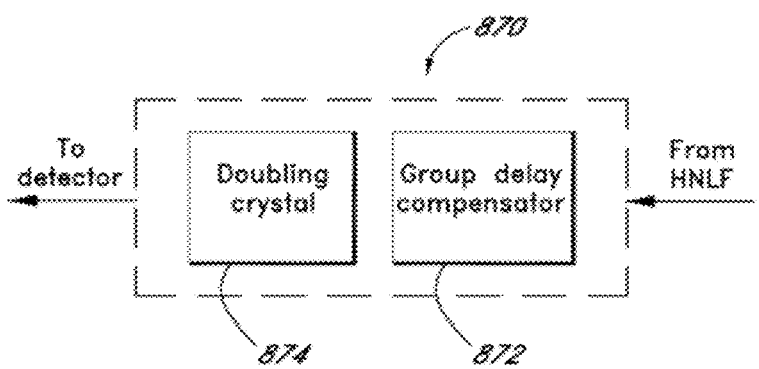
FIG.8G

ULTRA SMALL CORE FIBER WITH DISPERSION TAILORING

CROSS REFERENCE TO RELATED APPLICATIONS

The present application is a continuation of U.S. patent application Ser. No. 12/407,663, filed Mar. 19, 2009, entitled "ULTRA SMALL CORE FIBER WITH DISPERSION TAILORING," now U.S. Pat. No. 8,165,441, which claims priority to U.S. Provisional Patent Application No. 61/039,717, filed Mar. 26, 2008, entitled "ULTRA SMALL CORE FIBER WITH DISPERSION TAILORING;" each of the foregoing applications is hereby incorporated by reference herein in its entirety.

BACKGROUND

1. Field

Embodiments disclosed herein relate generally to optical fibers and more particularly to ultra small core fibers.

2. Description of the Related Art

Ultra small core fibers ("USCFs") have a variety of applications especially in devices that utilize optical nonlinearities. Ultra small core fibers have been used for supercontinuum generation, wavelength conversion, soliton-based pulse compression, and so forth.

U.S. Pat. No. 6,792,188 discloses a design where an inner layer of small holes is used to achieve tailored dispersion of a photonic crystal fiber. In this disclosure, a large number of air holes are used beyond the inner layer of small air holes. A significant drawback of this design is the need to use a large number of air holes beyond the inner layer of air holes to reduce confinement loss, especially for core diameters less than 2 μm.

In a paper by J. K. Ranka, et al., "Optical Properties of High-Delta Air Silica Microstructure Optical Fibers," Optics Letters, vol. 25, pp 796-798, 2000, the authors disclose a fiber with a core diameter of 1.7 μm surrounded by a triangular arrangement of a large number of air holes with $d/\Lambda \approx 0.9$, where d is the diameter of an air hole and $\Lambda$ is the center-to-center spacing of the air holes. The need for low confinement loss leads to the large air hole size (relative to the hole spacing) and the large number of air holes. The need for low confinement loss makes dispersion tailoring very difficult for a fixed core diameter.

U.S. Pat. No. 7,266,275 discloses a method of dispersion tailoring for a fiber incorporating a partially doped core to raise its refractive index. For small core diameters less than 2 μm, glass and air boundary plays a very significant part in confining light in the core. A refractive index change of a few percent over part of the core has very little impact on fiber dispersion.

SUMMARY

Various embodiments of optical fiber designs and fabrication techniques for fibers such as USCFs with low splice loss, tailored dispersion, and/or low scattering loss are provided.

Various embodiments include an optical fiber capable of propagating light having a wavelength, the optical fiber comprising a core, a first region at least partially surrounding the core, and a second region at least partially surrounding the first region. The first region comprises a plurality of first features. The first features have a first dimension, and the plurality of first features have a first filling factor in the first region. The second region comprises a plurality of second features. The second features have a second dimension and the plurality of second features have a second filling factor in the second region. The first dimension is less than the second dimension and the second filling factor is greater than about 90 percent.

Various embodiments include an optical fiber capable of propagating light having a wavelength wherein the optical fiber comprises a core, a first region at least partially surrounding the core, an air cladding surrounding the first region, an outer layer surrounding the air cladding, and a plurality of webs mechanically coupling the first region and the outer layer such that the air cladding is disposed therebetween. The first region comprises a plurality of first features. The first features have a first dimension and the plurality of first features have a first filling factor in the first region. The air cladding has an air-filling factor greater than about 90%.

Various embodiments include an optical fiber capable of propagating light having a wavelength, wherein the optical fiber comprises a core, a first air cladding at least partially surrounding the core and a second air cladding at least partially surrounding the first air cladding. The first air cladding comprises a plurality of air holes having a first size. The second air cladding comprises a plurality of air holes having a second size. The second size is greater than the first size. The first air cladding and the second air cladding are configured so that the fiber dispersion has a zero dispersion wavelength less than the wavelength of the light.

Various embodiments include a non-linear fiber optic system for producing broadband optical pulses comprising a laser source producing optical pulses having a wavelength, an optical fiber optically coupled to the laser source and capable of propagating light having said wavelength, and means for controlling dispersion of the pulses and for substantially confining the pulse to the core. The optical fiber receives energy from the laser source at a peak power. The optical fiber comprises a core having a diameter less than about 4 μm and sufficiently small such that the peak power exceeds a threshold for non-linearity of the optical fiber. The fiber produces broadband amplified pulses having a spectral bandwidth of at least about 50 nm.

For purposes of this summary, certain aspects, advantages, and novel features are described. It is to be understood that not necessarily all such advantages may be achieved in accordance with any particular embodiment. Thus, for example, those skilled in the art will recognize that embodiments may be provided or carried out in a manner that achieves one advantage or group of advantages as taught herein without necessarily achieving other advantages as may be taught or suggested herein. Furthermore, embodiments may include several novel features, no single one of which is solely responsible for the embodiment's desirable attributes or which is essential to practicing the systems and methods described herein. Additionally, in any method or process disclosed herein, the acts or operations of the method or process may be performed in any suitable sequence and are not necessarily limited to any particular disclosed sequence.

BRIEF DESCRIPTION OF THE DRAWINGS

FIG. 8A illustrates an example polarization maintaining fiber oscillator-amplifier coupled to a highly nonlinear fiber in conjunction with one embodiment of an oscillator phase control system.

FIG. 8B illustrates one embodiment of the polarization maintaining fiber oscillator of FIG. 8A wherein the oscillator design allows for phase control of the oscillator.

FIGS. 8C-8E illustrate some of the possible approaches for controlling the beat signal related to the carrier envelope offset frequencies associated with the system of FIG. 8A.

FIGS. 8F and 8G illustrate other design variations of fiber oscillators that facilitate generation of carrier envelope offset frequency beats for precision frequency comb generation.

Figure 1:
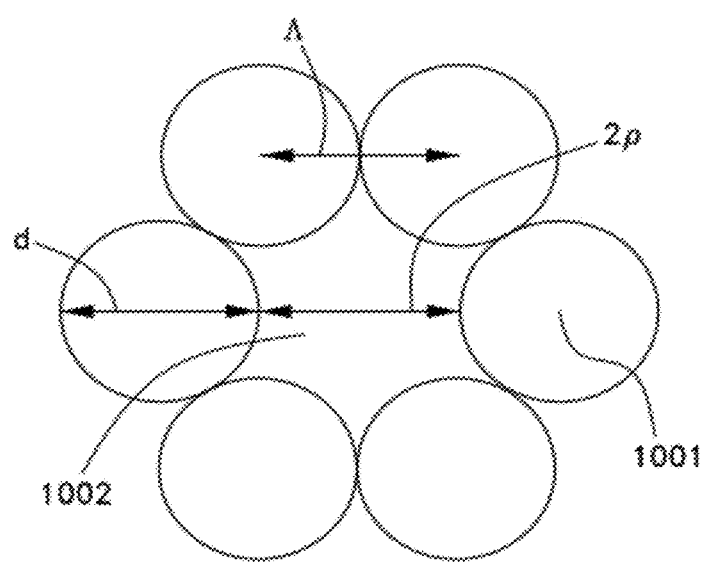
FIG. 1 schematically illustrates a cross-section of an embodiment of an optical fiber. The fiber comprises a core with a diameter 2ρ, and a cladding comprising holes with diameter, d, and center-to-center separation, $\Lambda$.

These and other features will now be described with reference to the drawings summarized above. The drawings and the associated descriptions are provided to illustrate embodiments of the invention and not to limit the scope of the invention. Throughout the drawings, reference numbers may be reused to indicate correspondence between referenced elements. In addition, the first digit of each reference number generally indicates the figure in which the element first appears.

DETAILED DESCRIPTION OF PREFERRED EMBODIMENTS

In the following detailed description, reference is made to "filling fraction," also known as "void-filling fraction" or "air-filling" fraction. In certain embodiments, the filling fraction refers to a cross-sectional area occupied by certain features in a region (such as, e.g., air holes in a cladding) divided by a total cross-sectional area of the region. The term filing factor is also used herein synonymously with filling fraction.

In certain such embodiments, the filling fraction may be determined for periodic features in the region, where, for example, a basic unit cell is repeated to fill the region. One possible expression for the filling fraction for circular features having a diameter d and center-to-center spacing (pitch) Λ in an infinite triangular matrix was disclosed in U.S. Pat. No. 6,444,133, entitled "Method of Making Photonic Bandgap Fibers" as the following formula:

$$\text{Filling Fraction} = \frac{\pi}{2\sqrt{3}} \left(\frac{d}{\Lambda}\right)^2$$

This formula for the filling fraction may be applied to, for example, conventional photonic bandgap or photonic crystal fibers having a very large number of features (such as holes). In many such fibers, at least a portion of the holes are circular in shape.

For the purpose of illustrating the filling factor for various embodiments, it is instructive to provide estimates for a fiber having a limited number of features and/or a finite matrix of features. Features having various size and shapes may be utilized in various embodiments, for example, and the features may have regular and/or irregular shapes. In some embodiments, estimates for the filling fraction may not be obtainable in closed form, and may be determined using computational numerical methods.

In certain fiber embodiments, the fiber cross-section comprises a regular matrix of substantially identical features that are symmetrically arranged. A first example of a fiber cross-section having a finite number of features is shown in FIG. 1A. In this example, an annular region (or band) 1510 between concentric circles 1501 and 1502 includes a matrix of twelve features 1500. In this example, each feature 1500 of the matrix has substantially the same cross-sectional shape and size and has a cross-sectional area $A_F$. The feature area $A_F$ may be, for example, computed from predetermined geometric parameters describing the shape and size, digitized using a graphic tool, and/or estimated with any suitable computational methods and means. In the example shown in FIG. 1A, an inner radius $R_1$ of the annular region 1510 corresponds to the inscribed circle 1501, which is tangent to inner edges of the features 1500. An outer radius $R_2$ of the annular region 1510 corresponds to the circumscribed circle 1502, which is tangent to outer edges of the features 1500. The filling fraction may be estimated by calculating the ratio of the total area of the features 1500 to the area of the annular region 1510. In the example shown in FIG. 1A, the filling fraction may be determined to be $12A_F/\pi(R_2^2-R_1^2)$.

In other embodiments, the fiber cross-section may comprise features that are irregularly shaped and/or asymmetrically arranged. In a second example schematically illustrated in FIG. 1B, the fiber cross-section comprises features 1600 that are disposed in a region (or band) 1610 having an inner boundary 1601 and an outer boundary 1602. In this example, each of the boundaries 1601, 1602 comprises tangent lines linking adjacent features. The boundaries 1601, 1602 may include a portion of the edge of a feature 1600 in some cases. As can be seen from the example in FIG. 1B, the inner boundary 1601 comprises line segments. In some cases, lines linking adjacent features intersect before reaching an edge of the feature (see, e.g., the inner boundary near features 1604-A and 1604-B). If line segments from adjacent features intersect the edge of a feature before intersecting each other, then a portion of the edge of the feature will form part of the boundary (see, e.g., feature 1605 where edge portion 1605-A forms part of the boundary 1602).

Figure 1A:
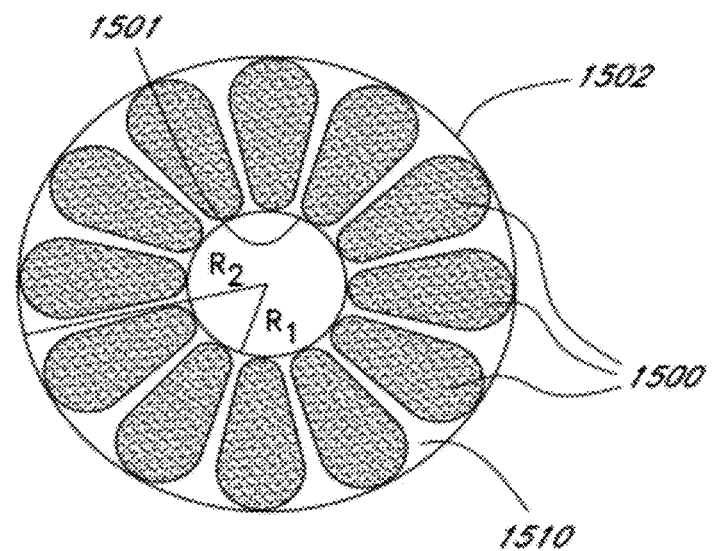
FIGS. 1A and 1B provide examples of methods to estimate filling fractions or factors for a finite matrix (or array) of cladding features of regular and arbitrary shapes, respectively.
Figure 1B:
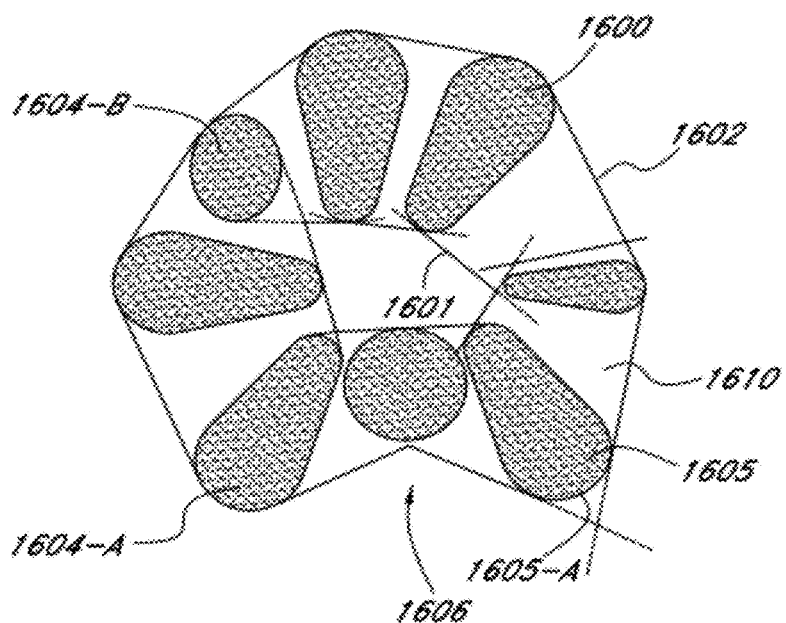

FIG. 1B demonstrates that portions of the boundaries of the region 1610 may be convex or concave. For example, in FIG. 1B, the boundary 1601 is convex and a portion 1606 of the boundary 1602 is concave. As can be seen from FIG. 1B, a boundary may not intersect all the features. For example, the inner boundary 1601 does not intersect the features 1604-A or 1604-B. Note that in both these embodiments, for a given portion of the region (or band) 1610 between two features, the region (or band) is at least as thick as the smallest of the two features. Nowhere is the region or band 1610 thinner than the two closest features that define the region or band.

The above-described methods for determining the filling fraction may be used for fiber embodiments having cross-sections with multiple regions of features. Estimates obtainable using mathematical formulas, numerical computations (including manual estimates) are sufficiently accurate so as to not substantially affect predicted optical propagation properties of embodiments of USCFs.

Three problems have hampered practical development of state-of-art USCFs. The first problem is the difficulty in splicing a USCF to a conventional fiber due to the large mode size mismatch of the USCF and the conventional fibers. For example, a USCF can have a mode field diameter (MFD) of less than 3 µm, while conventional fibers typically have MFD larger than 6 µm. The second problem is the difficulty of tailoring fiber dispersion while maintaining a low confinement loss. Many USCF fibers have a cladding formed by air holes in a background material, typically a glass. For very small core diameter optical fibers, very large air holes are required to reduce or minimize confinement loss and/or to avoid having an excessively large number of air holes. This leads to inflexibility for tailoring dispersion of the USCF. Dispersion tailoring is advantageous for optimized operation of certain devices utilizing optical nonlinearities, because of the ability to phase match and/or group velocity match at different wavelengths and/or to operate in higher order soliton modes. The third problem confronting a USCF is high loss. USCF loss arises primarily from scattering loss at glass-air interfaces. High loss occurs for two reasons when the core diameter is small. The first reason is that there is much more optical energy at the glass-air interfaces for small core fibers than for large core fibers. Certain USCF comprise thin glass webs, which result from using large air holes to reduce confinement loss. The second reason for the scattering loss is that the webs tend to have more surface irregularities due to their small thickness, which leads to more scattering loss.

Computer simulations have been performed to calculate the dispersion in optical fibers. As described above, in some small core fibers with small core diameter (<2 µm), very large air holes are used to reduce or minimize confinement loss. To calculate the dispersion of such fibers, the computer simulation uses a fiber design having a cross-section shown in FIG. 1. The fiber of FIG. 1 comprises a cladding having six large circular holes 1001 having a diameter of d. The center-to-center separation of the holes 1001 is $\Lambda$. For the simulation, the holes 1001 are assumed to be filled with a material having a refractive index of one (e.g., air). The fiber comprises a core 1002 having a diameter $2\rho=2\Lambda-d$.

Because high optical nonlinearity is achievable with very small core sizes, various embodiments utilize very small core fibers, for example, a fiber having a core of with a diameter in a range from about 1 µm to about 4 µm. In certain applications, it may be desirable to achieve a relatively high index contrast between the holes 1001 and the surrounding material in order to guide an optical beam propagating within the fiber. Therefore, in certain preferred embodiments the holes 1001 are considered to be filled with a gas or a mixture of gases (e.g., air), to provide a reasonably high index contrast.

Figure 2:
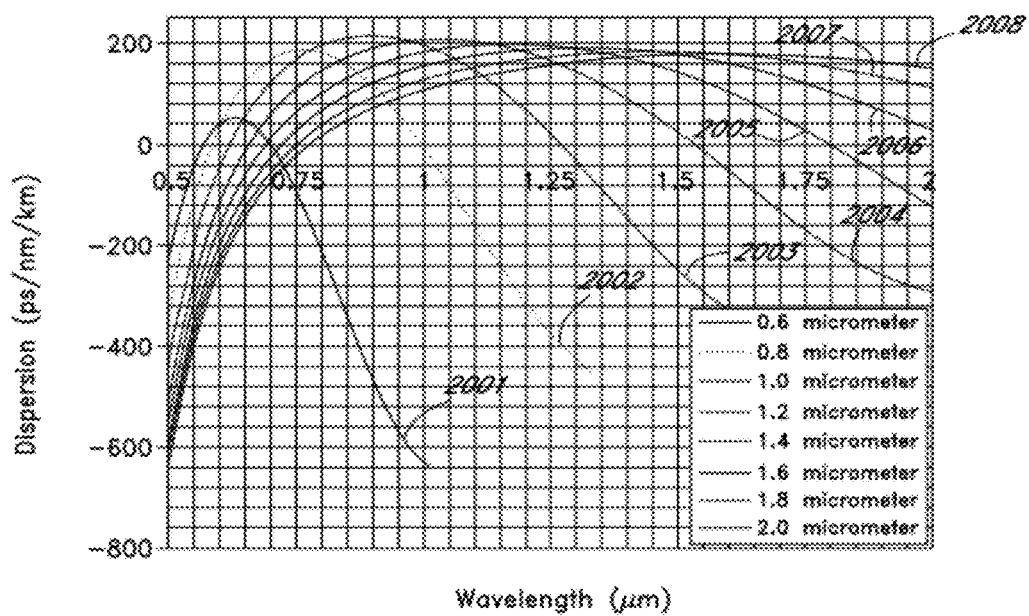
FIG. 2 is a graph that shows an example of simulated results for dispersion of fibers having the cross-section schematically illustrated in FIG. 1. In this example, the fiber cladding comprises six air holes with a refractive index of 1 and with d/Λ=0.99. The graph shows dispersion (in units of ps/nm/km) as a function of wavelength (in μm) for various core diameters.

FIG. 2 is a graph that shows an example of simulated results for the dispersion of fibers having the cross-section schematically illustrated in FIG. 1. The graph shows dispersion (in units of ps/nm/km) of the fiber as a function of the wavelength (in µm) of light propagating in the fiber. The wavelength range shown in FIG. 1 is from 0.5 µm to 2.0 µm. In this example, the simulation was performed for $d/\Lambda=0.99$. Curves 2001-2008 illustrate the dispersion for eight values of the core diameter $2\rho=0.6, 0.8, 1.0, 1.2, 1.4, 1.6, 1.8,$ and $2.0$ µm, respectively. The dispersion curves 2001-2008 show few features in this simulation. A zero dispersion wavelength (ZDW) is a wavelength at which the dispersion is zero. The dispersion curves 2001-2008 each exhibit two ZDWs, the first ZDW at a smaller wavelength than the second ZDW (the second ZDW is not shown in FIG. 2 for curves 2006, 2007, and 2008). FIG. 2 demonstrates that as the core diameter decreases, the first and the second ZDW move toward shorter wavelengths. For wavelengths between the first and the second ZDW, the dispersion is positive (e.g., anomalous dispersion). FIG. 2 demonstrates that the maximum of the anomalous dispersion is about 200 ps/nm/km for all fiber core diameters used in the simulation, with the exception of the fiber with the 0.6 µm core diameter (the curve 2001).

For a variety of nonlinear devices providing, for example, supercontinuum generation and/or wavelength conversion, low dispersion and/or relatively flat dispersion may be advantageous, due to the need for higher-order soliton effects and phase matching among different optical wavelengths in some such devices. Additionally, a small core is generally desirable in these fibers, because enhanced nonlinearity can be achieved through higher optical intensity in a small core fiber at a fixed optical power. The results shown in FIG. 2 demonstrate that small core fibers having the cross-section shown in FIG. 1 generally do not provide low and/or relatively flat dispersion. Accordingly, a disadvantage of such USCFs is the inability to simultaneously satisfy the need for both low confinement loss and tailored dispersion without having to use an excessive large number of air holes.

Figure 3A:
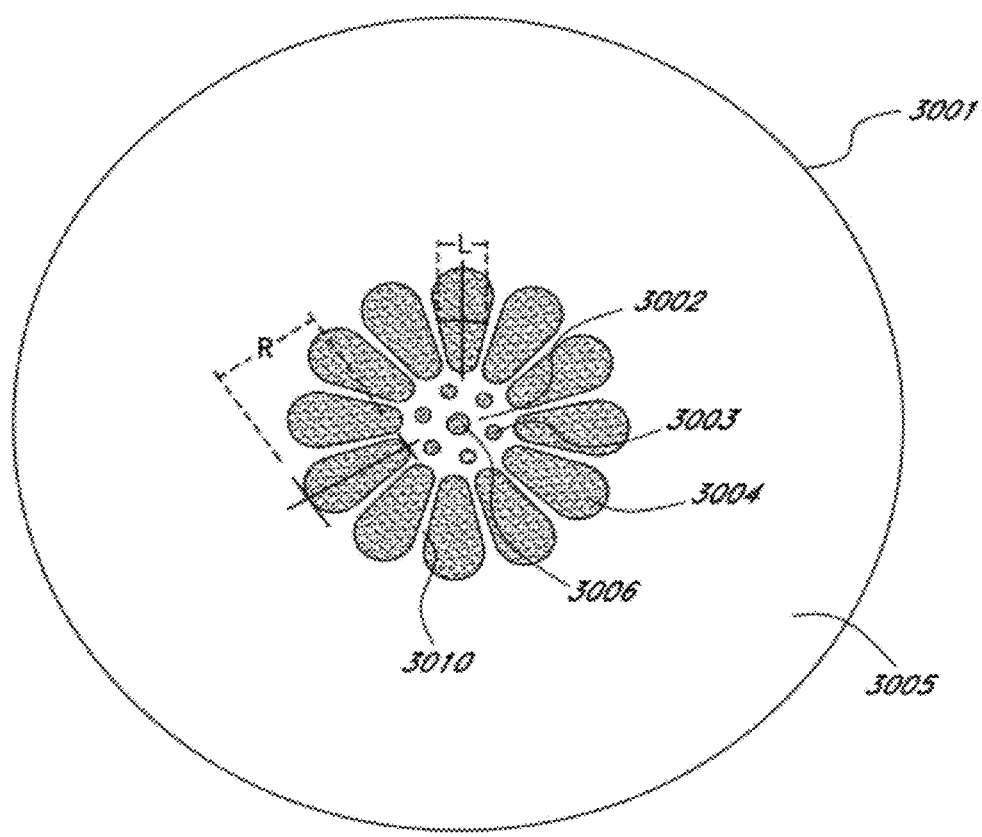
FIG. 3A schematically illustrates a cross-section of an embodiment of a USCF comprising a core surrounded by first features that comprise relatively small holes. The core and the first features are surrounded by second features that comprise relatively larger holes. In some embodiments, the first features may be used to tailor dispersion and the second features may be used to provide optical confinement.

FIG. 3A schematically illustrates an example cross-section of an embodiment of a USCF 3001. The USCF 3001 comprises a core 3002, a first region comprising first features 3003, and a second region comprising second features 3004. The first region substantially surrounds the core 3002, and the second region substantially surrounds the first region. An outer layer 3005 substantially surrounds the second region. The core 3002 and the outer layer 3005 may be formed from the same material or from different materials. In some embodiments, the core 3002 and/or the outer cladding 3005 comprise a glass such as, for example, fused silica. In some embodiments, the core 3001 comprises fused silica doped with one or a combination of germanium, phosphorous, fluorine, boron, aluminum, titanium, tin, and rare earth elements. For example, in the embodiment illustrated in FIG. 3A, the core 3002 of the fiber 3001 comprises a core region 3006 that is doped with a dopant such as, e.g., germanium. The core region 3006 may form a central portion of the core 3002 as depicted in FIG. 3A. Embodiments of the fiber 3001 comprising a doped core region 3006 may provide enhanced optical nonlinearity and/or reduced splice loss, for example, as described in U.S. patent application Ser. No. 11/691,986, filed Mar. 27, 2007, entitled "Ultra High Numerical Aperture Optical Fibers," which is owned by the assignee of the present application, and which is hereby incorporated by reference herein in its entirety. In other embodiments, the glass may comprise an oxide glass, a fluoride glass, and/or a chalcogenide glass, any of which may be doped with one or more of dopants described above for fused silica. In certain embodiments, at least a portion of the core 3001 is doped to provide optical gain. In some embodiments, the fiber 3001 may be "all-glass," such that the core 3002 and the outer layer 3005 in which the first and the second features 3003, 3004 are disposed may comprises glass at least over a portion of the fiber length. In some all-glass embodiments, the first features 3003 and/or the second features 3004 may comprise a glass.

In the embodiment illustrated in FIG. 3A, the first features 3003 and the second features 3004 comprise holes that may be at least filled with a material having a refractive index different from the material forming the core 3002 and/or the outer layer 3005. For example, in some embodiments, the first and the second features 3003, 3004 are filled with air. In other embodiments, some or all of the first and/or the second features 3003, 3004 may be filled with other gases and/or liquids. Generally, a refractive index of approximately unity for the material in the features is desirable for increased index contrast. In yet other embodiments, some or all of the first and/or the second features 3003, 3004 are evacuated to provide a partial vacuum.

In the embodiment of the fiber 3001 schematically illustrated in FIG. 3A, the first features 3003 comprise six substantially circular holes that are arranged substantially symmetrically around the core 3002. In other embodiments, a different number of first features may be utilized such as, for example, 1, 2, 3, 4, 5, 10, or more features. In other embodiments, the first features 3003 may be arranged differently than shown in FIG. 3A and/or may have different shapes (e.g., non-circular) than shown in FIG. 3A. For example, the first features 3003 are not symmetrically arranged around the core 3002 in some embodiments.

In the embodiment of the fiber 3001 schematically illustrated in FIG. 3A, the second features 3004 comprise twelve holes that are arranged substantially symmetrically around the core 3002 and around the first features 3003. In other embodiments, a different number of second features may be utilized such as, for example, 1, 2, 3, 4, 5, 10, 15, 24, or more features. In other embodiments, the second features 3004 may be arranged differently than shown in FIG. 3A. For example, the second features 3004 are not symmetrically arranged around the core 3002 and/or the first features 3003 in some embodiments. In the embodiment shown in FIG. 3A, the second features 3004 comprise radially elongated holes having a "teardrop" shape. Other shapes are used in other embodiments. In some embodiments, adjacent second features 3004 are disposed relatively close to each other, thereby forming a relatively thin, elongated web 3010 between the adjacent features. For example, in the embodiment shown in FIG. 3A, the fiber 3001 comprises 12 webs 3010. The ratio of radial length to transverse width may be equal to or greater than about 4, about 6, about 8, about 10 or more in some embodiments.

In the embodiment of the fiber 3001 depicted in FIG. 3A, the first features 3003 have a diameter A. The second features 3004 have a radial length R and an azimuthal length L. In the illustrated embodiment, the diameter A of the first features 3003 is less than the radial length R and the azimuthal length L of the second features 3004. The radial length is measured along the centerline through second features 3004 in the radial direction, and the azimuthal (e.g. arc) length L is measured through the azimuthally directed line midway along the radial length of the second features 3004. For example, in some embodiments, the ratio R/A (and/or the ratio L/A) may be in a range from about 1 to about 50. In certain embodiments, the ratio of R/A (and/or L/A) is equal to or greater than about 1, about 2, about 3, about 4, or about 5. Additionally, the ratio R/L is equal to or greater than about 2. Different ratios are used in other embodiments. As discussed above, first region comprises the first features 3003, and the second region comprises the second features 3004. In certain embodiments, the first features 3003 have a first filling fraction in the first region, and the second features 3004 have a second filling fraction in the second region. The first filling fraction and the second filling fraction may have any suitable values. For example, in certain embodiments the first filling fraction is between about 0.2% and about 90%. The first filling fraction is greater than about 30% in some embodiments. In other embodiments, the first filling factor is greater than about 5%, greater than about 15%, greater than about 25%, greater than about 35%, greater than about 45%, greater than about 55%, or some other value. In certain embodiments the second filling fraction is between about 90% and about 99.9%. The second filling fraction is greater than about 90% in some embodiments. In other embodiments, the second filling factor is greater than about 50%, greater than about 60%, greater than about 70%, greater than about 80%, greater than about 95%, or some other value. For example, in the embodiment of the USCF 3001 schematically illustrated in FIG. 3B, the first filling factor is about 55% and the second filling factor is about 95%.

In some embodiments of the fiber 3001, the first features 3003 may be used to tailor dispersion, and the second features 3004 may be used to provide optical confinement for light propagating in the fiber 3001 (e.g., to reduce confinement loss). For example, in certain embodiments, the size of the first features 3003 may be used for dispersion tailoring, and the radial and/or azimuthal size of the second features 3004 may be used for reducing confinement loss.

In some embodiments, the core 3002 may have a size that is about one-half the wavelength $\lambda$ of the light propagating in the fiber 3001. Fiber embodiments with core sizes as small as $\lambda/2$ may provide reasonable confinement loss and a range of tailored dispersion. An advantage of some embodiments of the fiber 3001 is that confinement of optical power by the first features 3003 reduces the amount of optical power at the interfaces of the second features 3004 (e.g., air-glass interfaces in some embodiments). As described above, in certain embodiments, the arrangement of the second features 3004 may form a plurality of webs 3010. In certain such embodiments, the webs 3010 may have a relatively high surface area that may include surface irregularities, which could possibly contribute toward a higher scattering loss. An advantage of some embodiments of the fiber 3001 is that the reduction of optical power (by the first features 3003) in the region of the second features 3004 also may reduce scattering losses at the web interfaces, thereby effectively reducing the scattering loss of the fiber 3001.

Another possible benefit of some embodiments of the fiber 3001 is that the fiber 3001 may be spliced to a conventional fiber with relatively low splice loss. The conventional fiber may a step-index fiber, a graded-index fiber, or any other suitable optical fiber. In some embodiments, the fiber 3001 may be spliced to a holey fiber, photonic crystal fiber, or a length of fiber that is substantially similar to the fiber 3001.

Figure 3B:
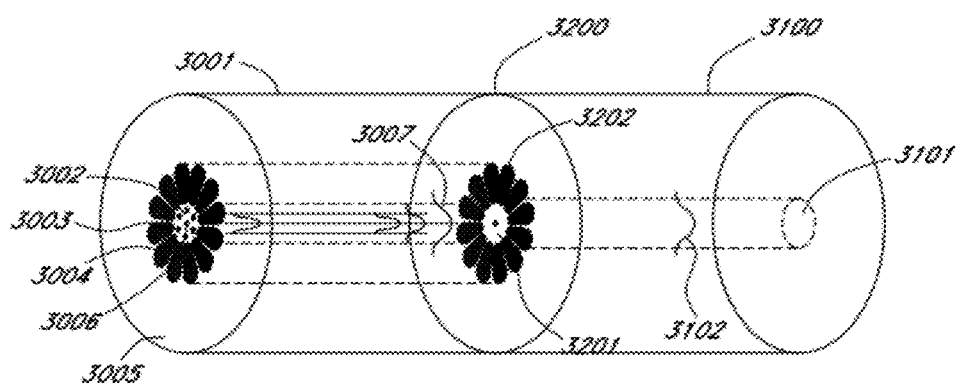
FIG. 3B schematically illustrates a length of an embodiment of a USCF that is spliced to a conventional fiber. This embodiment of the USCF provides low loss splice due to expansion of an optical mode at the splice.

FIG. 3B schematically illustrates an embodiment of the fiber 3001 coupled at a splice 3200 to a conventional fiber 3100. In this illustrative example, the conventional fiber 3100 is a high numerical aperture fiber comprising a core 3101 that is larger than the core 3002 of the fiber 3001. The fiber 3100 supports propagation of an optical mode 3102. While propagating in the fiber 3100, the optical mode 3102 is confined substantially to the core as indicated by the curve 3102 in FIG. 3B, which schematically represents a modal energy distribution.

The splice 3200 may be produced by any suitable splicing technique such as, for example, a fusion splice. For example, in one embodiment of a method for splicing the fiber 3001 to the fiber 3100, a section of the fiber 3001 is heated (e.g., by an electric arc) before splicing in order to reduce or substantially eliminate the first features 3003. After heating, the section may have a reduced cross-sectional area in some embodiments. In certain embodiments of this method, some of the heated section of the fiber 3001 fuses, melts, or collapses into a substantially solid structure with substantially total elimination of the first features 3003 (possibly due to the larger surface tension of small air holes in some embodiments). In certain embodiments, the second features 3004 are reduced in size by the heating, but the second features near the splice region (indicated by reference numeral 3202) are not fully collapsed (see, FIG. 3B). In other embodiments, the second features 3004 are substantially fully collapsed near the splice 3200. In some embodiments of the splicing method, the core 3002 of the USCF 3001 remains substantially intact during the heating/collapsing/splicing process. For example, in the embodiment illustrated in FIG. 3B, the optional doped region 3006 of the core 3002 remains intact indicated by reference numeral 3201) near the splice 3200. The optional doped region 3201 near the splice 3200 may further confine optical power in the core 3201 and lower splice loss at the splice 3200.

FIG. 3B schematically illustrates propagation of an optical mode 3007 in the USCF 3001 toward the splice 3200. While propagating in the USCF 3001, the mode 3007 is confined substantially to the core 3001. As the optical mode 3007 nears the region where the splicing process has reduced (or substantially eliminated) the first features 3003, the mode 3007 begins to expand as schematically illustrated in FIG. 3B. In certain embodiments, expansion of the mode 3007 may cause negligible loss if an adiabatic condition is satisfied near the splice 3200, e.g., if the reduction of the first features 3003 occurs more slowly than what a local optical mode can follow.

In the illustrated embodiment, when the mode 3007 reaches the splice 3200, the optical power of the mode 3007 substantially matches the optical power of the mode 3102 that can be propagated in the core of the conventional fiber 3100. For example, the above-described method advantageously permits a low loss splice to be performed between the USCF 3001 and the conventional optical fiber 3100, due to the substantially close match of the mode field diameters at the splice 3200.

Figure 4:
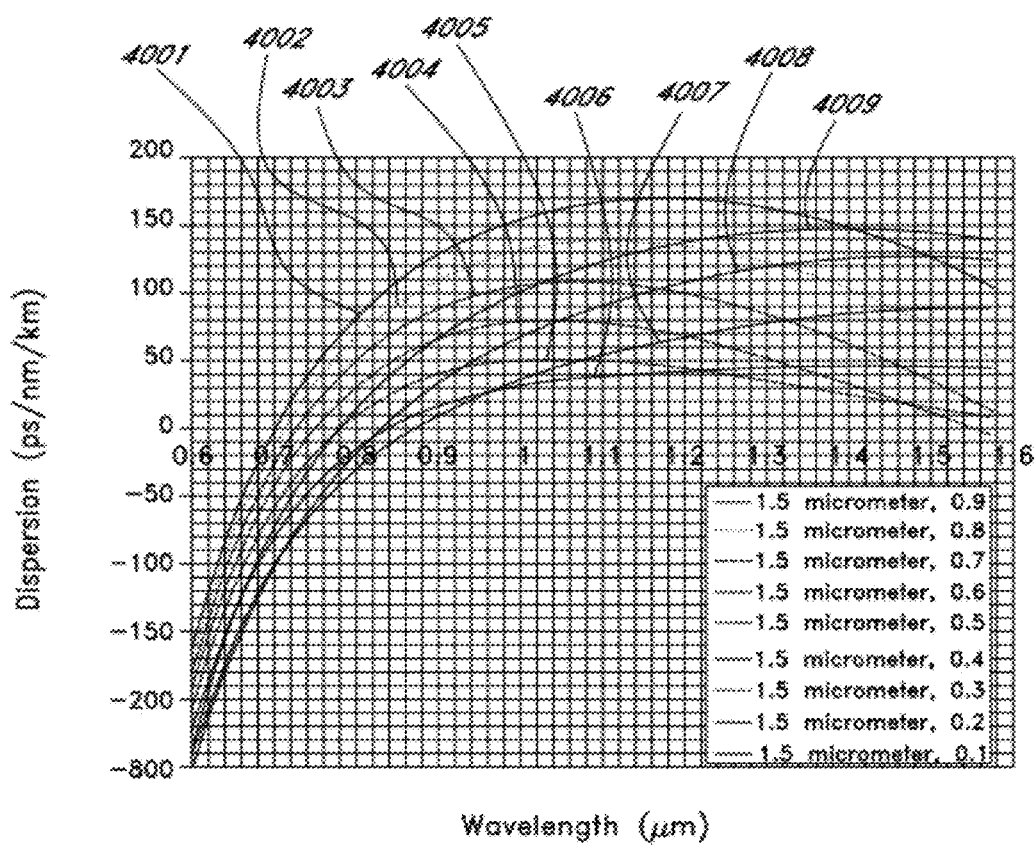
FIG. 4 is a graph that shows an example of simulated results for dispersion of an embodiment of a USCF fiber having a cross-section as shown in FIG. 3A. In this simulation, the USCF has a core diameter of 1.5 μm, and the first features are circular with diameter d and center-to-center spacing Λ. The graph shows dispersion (in units of ps/nm/km) as a function of wavelength (in μm) for various d/Λ of the first features.

FIG. 4 is a graph that shows an example of simulated results for dispersion of an embodiment of a USCF fiber having the cross-section shown in FIG. 3A. In this simulation, the USCF has a core diameter $2\rho=1.5$ μm, and the first features are circular with diameter, d, and center-to-center spacing, $\Lambda$. The graph shows dispersion (in units of ps/nm/km) as a function of wavelength (in μm) for various $d/\Lambda$. The wavelength range in FIG. 4 is between 0.6 μm and 1.6 μm. Curves 4001-4009 are for $d/\Lambda=0.9, 0.8, 0.7, 0.6, 0.5, 0.4, 0.3, 0.2$, and 0.1, respectively. The results shown in FIG. 4 demonstrate that a range of dispersion may be achieved for this embodiment of a USCF having a core diameter of 1.5 μm. For example, a relatively flat, low dispersion can be achieved near a wavelength of 1 μm for USCF embodiments having $d/\Lambda$ between about 0.4 and about 0.6. The dispersion curve 4004 has two zero dispersion wavelengths (ZDW), a first ZDW at a shorter wavelength (about 0.75 μm), and a second ZDW at a longer wavelength (about 1.56 μm). Curves 4001, 4002, 4003, 4005, 4006, 4007, 4008, and 4009 have a single ZDW in the simulated wavelength range shown in FIG. 4. In some nonlinear systems such as, for example, systems providing supercontinuum generation, it may be advantageous to pump the system at the anomalous dispersion side of the longer wavelength ZDW. Because many convenient pump sources emit light at wavelengths of about 1.05 μm, it may be beneficial to tailor the dispersion of the USCF so that the first ZDW occurs at wavelengths slightly shorter than about 1.05 μm. FIG. 4 demonstrates that the dispersion of embodiments of the USCF disclosed herein may be tailored so that the first ZDW occurs in a range from about 0.7 μm to about 0.87 μm, and such USCF embodiments may be advantageously used in systems providing supercontinuum generation.

Figure 5:
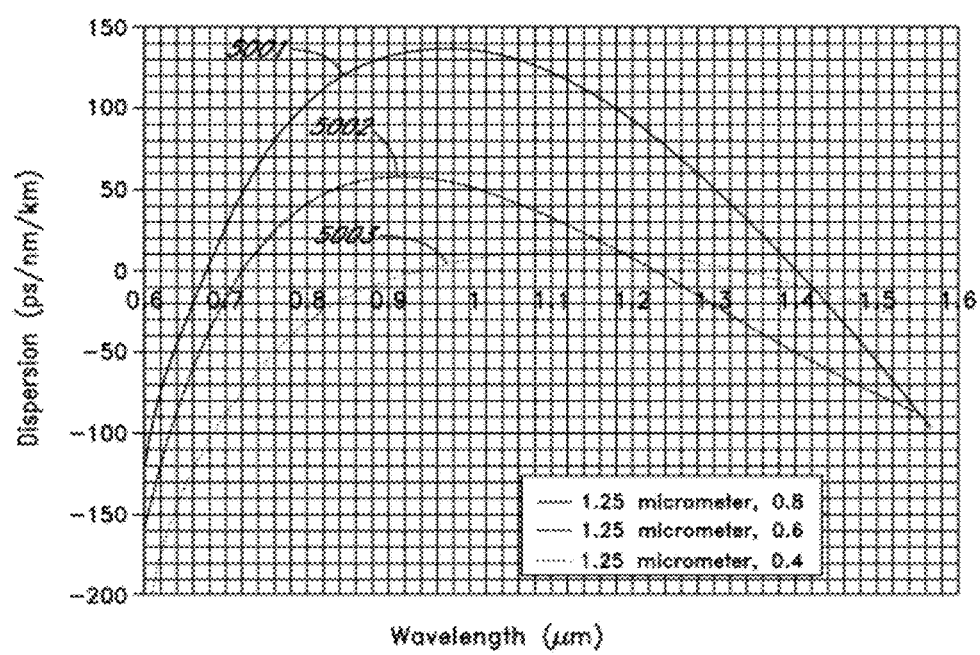
FIG. 5 is a graph that shows an example of simulated results for dispersion of fibers having a core diameter of 1.25 μm. The graph shows dispersion (in units of ps/nm/km) as a function of wavelength (in μm) for various d/Λ of the inner cladding features.

FIG. 5 is a graph that shows another example of simulated results for dispersion of an embodiment of a USCF fiber having the cross-section shown in FIG. 3A. In this example, the USCF has a core diameter $2\rho=1.25$ μm, and the graph shows the dispersion for three values of $d/\Lambda$. Curves 5001, 5002, and 5003 are for USCF embodiments having $d/\Lambda=0.8$, 0.6, and 0.4, respectively. FIG. 5 shows for these USCF embodiments that a relatively flat dispersion may be provided, and the dispersion may be tailored so that the zero dispersion wavelengths occur in desired wavelength regions. For example, the first ZDW for the curve 5003 is at about 0.94 microns, and the dispersion is relatively flat between about 1 micron and about 1.25 microns.

Figure 6:
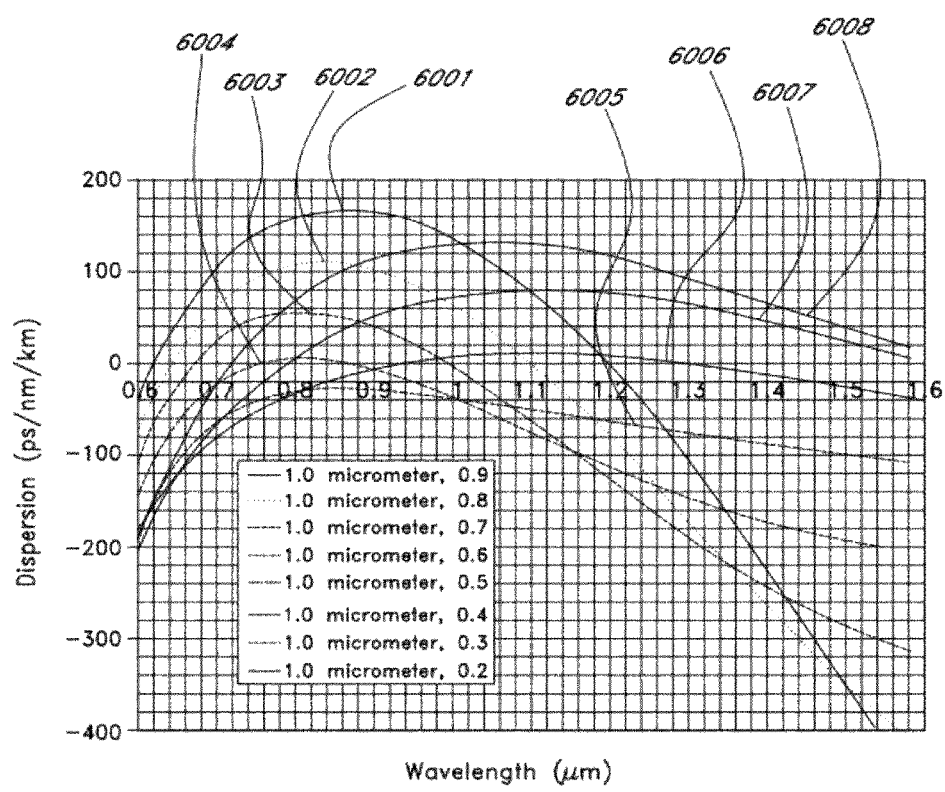
FIG. 6 is a graph that shows an example of simulated results for dispersion of fibers having a core diameter of 1.0 μm. The graph shows dispersion (in units of ps/nm/km) as a function of wavelength (in μm) for various d/Λ of the inner cladding features.

FIG. 6 is a graph that shows another example of simulated results for dispersion of an embodiment of a USCF fiber having the cross-section shown in FIG. 3A. In this example, the USCF has a core diameter $2\rho=1.0$ μm, and the graph shows the dispersion for eight values of $d/\Lambda$. Curves 6001-6008 are for $d/\Lambda=0.9, 0.8, 0.7, 0.6, 0.5, 0.4, 0.3$, and 0.2, respectively. FIG. 6 demonstrates that certain embodiments of the USCF may provide tailored positive dispersion, negative dispersion, and/or flattened dispersion in various portions of the wavelength range shown in the graph.

In certain implementations, embodiments of USCF may be fabricated according to a method in which a preform stack is formed into a cane and the cane is drawn into an optical fiber.

Figure 7:
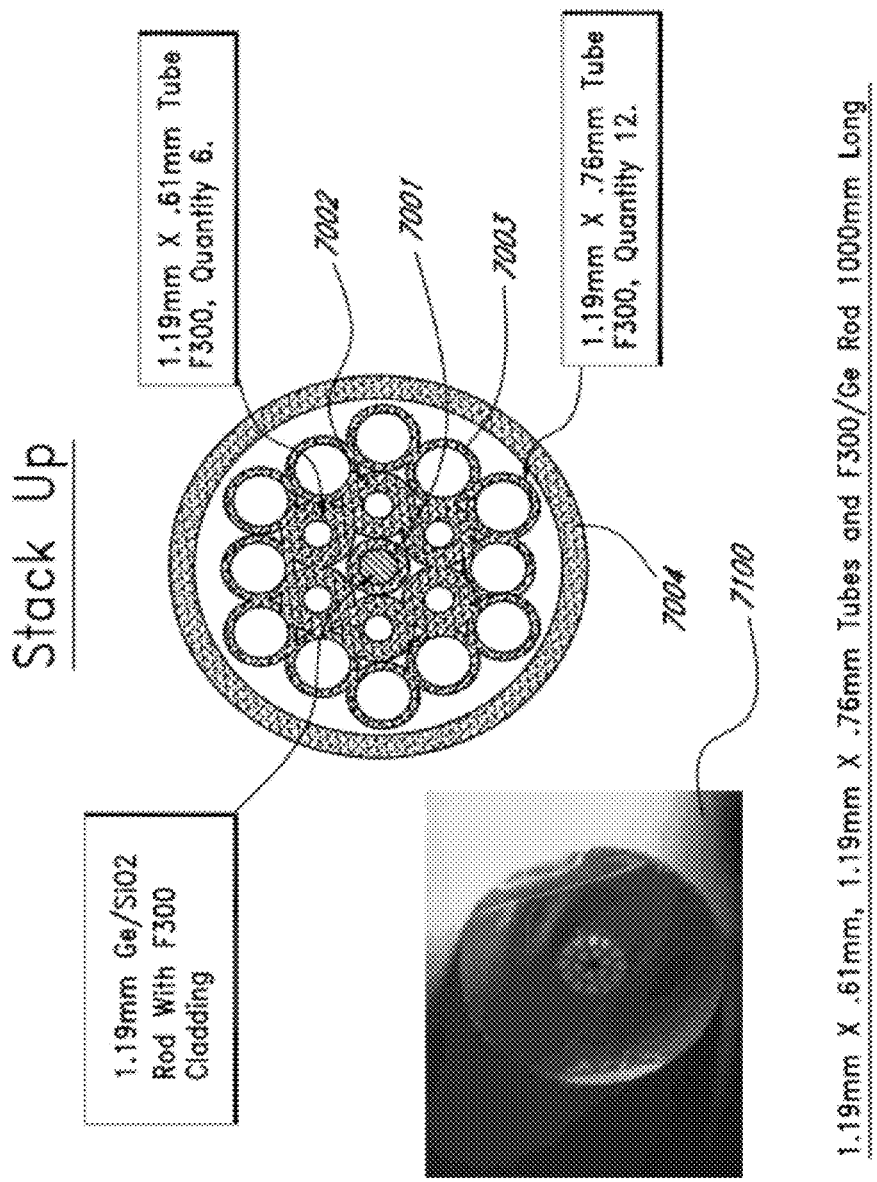
FIG. 7 schematically illustrates an embodiment of a preform stack for making canes and a cross section of an embodiment of a fabricated cane. The cane may be drawn into an embodiment of USCF.

FIG. 7 schematically illustrates an embodiment of a preform stack for making canes and a cross-section of an embodiment of a fabricated cane. In the example shown in FIG. 7, a rod 7001 having a diameter of about 1.19 mm was disposed substantially in the center of a preform stack. The rod 7001 was solid and included a germanium-doped silica ($SiO_2$) center portion surrounded by a silica cladding. Six tubes 7002 were disposed around the rod 7001. Each of the tubes 7002 was hollow and had an inner diameter of about 0.61 mm and an outer diameter of about 1.19 mm. Twelve tubes 7003 were disposed around the tubes 7002 as shown in FIG. 7. Each of the tubes 7003 was hollow had an inner diameter of about 0.76 mm and an outer diameter of about 1.19 mm. In other embodiments, some or all of the tubes 7002, 7003 may be partially or completely solid.

The stack of the rod 7001, the tubes 7002, 7003 was disposed in an outer tube 7004. In this example arrangement, the outer tube 7004 comprised silica and had an inside diameter of about 6.2 mm and an outside diameter of about 8.4 mm. In this example, a pressurizing system was use to apply a pressure of about 2 psi to the inside of the tubes 7002 and 7003 during the caning process. While the tubes were pressurized, a cane 7100 having a 1.63 mm outer diameter was drawn. In certain embodiments, one or more inert gases are used in the pressurization system, while in other embodiments, air, nitrogen, oxygen, and/or other gases can be used.

The cane 7100 was inserted into an outer tube having an inner diameter of about 2 mm and an outer diameter of about 16.33 mm. In this example fabrication process, a pressure of about 2 psi was applied to the hollow tubes, and a partial vacuum of about −5 in Hg was applied to the inside of the outer tube. While pressurized, the preform was drawn at a temperature of about 195° C. The preform was fed into the heating furnace at about 6 mm/min and was drawn at 92 mm/min into a fiber with an outer diameter of about 125

Figure 8:
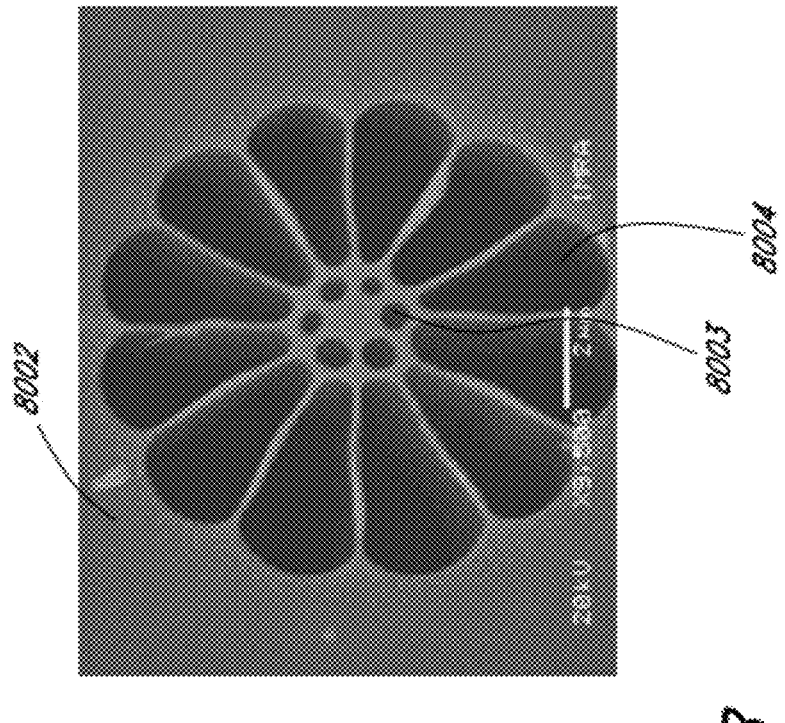
FIG. 8 includes scanning electron microscope (SEM) photographs of an embodiment of a USCF drawn using an embodiment of the cane shown in FIG. 7. The left panel shows the fiber cross-section, and the right panel is a closeup view of the center regions of the fiber.
Figure 8:
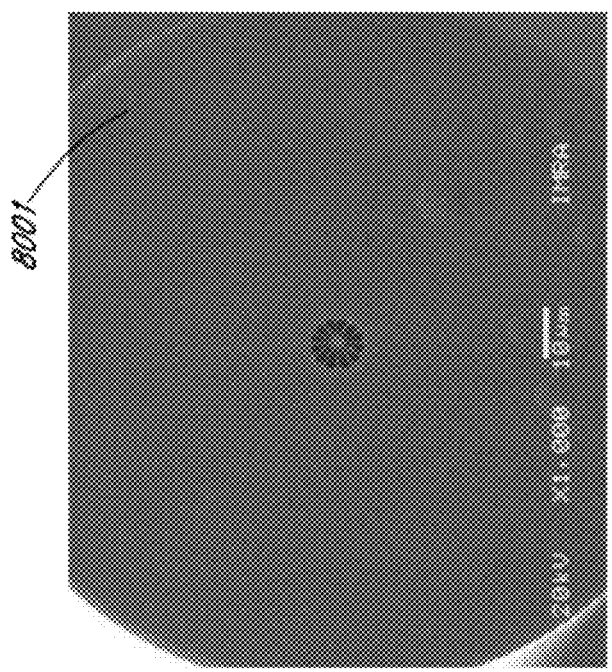

FIG. 8 includes scanning electron microscope (SEM) photographs of an embodiment of USCF 8001 drawn with the cane 7100 shown in FIG. 7. The left panel of FIG. 8 shows the cross section of the fiber 8001, and the right panel is a closeup view showing the inner structure 8002 of the fiber 8001, which comprises a core 8002, first features 8003, and second features 8004. In this embodiment of the fiber 8001, the first features 8003 comprise six substantially circular holes, and the second features 8004 comprise twelve "teardrop" shaped holes. FIG. 8 demonstrates that in this example embodiment, the second features 8004 are significantly expanded under pressure during fiber drawing to achieve a larger air-filing factor than possible with certain conventional stack-and-draw processes such as, for example, the process described in U.S. Pat. No. 6,792,188.

This fabrication procedure described herein is one possible embodiment of the fabrication procedure. In other embodiments of the procedure, variations of rod and tube dimensions, applied pressure, applied vacuum, and drawing condition may be used. In other embodiments, additional layers of tubes may be used to provide third features, fourth features, and so forth. Different numbers of tubes may be used. Further details of fiber fabrication procedures are described in, for example, the above-incorporated U.S. patent application Ser. No. 11/691,986.

Example Applications for USCF Embodiments

Embodiments of the USCFs described herein advantageously may be utilized in a variety of applications including, for example, nonlinear amplifiers, continuum generation, frequency metrology systems employing comb generators, and systems for stretching ultrashort pulses.

The disclosure of U.S. patent application Ser. No. 11/372,859, entitled "Pulsed Laser Sources," filed Mar. 10, 2006 (hereinafter the '859 application), and published as U.S. Patent Application Publication 2006/0198398 is hereby incorporated by reference in its entirety. FIGS. 8A-8G (reproduced herein as FIGS. 8A-8G) and the corresponding text of the '859 application describe embodiments of systems for frequency comb generation, which may be used for frequency metrology and/or high resolution spectroscopy. Embodiments of such systems may be useable for precision timing measurements and/or for high resolution spectroscopy, the latter application showing promise for disease detection.

By way of example, FIG. 8A of the '859 application illustrates an embodiment of a polarization maintaining fiber oscillator-amplifier coupled to a highly nonlinear fiber in conjunction with one embodiment of an oscillator phase control system. In FIG. 8A, the frequency comb source 800 comprises a polarization maintaining fiber oscillator 801. An output from the oscillator 801 is directed via an isolator 802 to a polarization maintaining fiber amplifier 803. As shown in FIG. 8A, the fiber amplifier 803 is connected via a splice 804 to a highly nonlinear fiber (HNLF) 805. The highly nonlinear fiber 805 is preferably constructed from a holey fiber or a standard silica fiber or using bismuth-oxide based optical glass fiber in various embodiments. The dispersion of the highly nonlinear fiber 805 is preferably close to approximately zero at the emission wavelength of the oscillator 801 for certain designs. Even more preferably, the dispersion profile is flattened, i.e., the third-order dispersion of the fiber 805 is equally close to approximately zero. The highly nonlinear fiber 805 does not need to be polarization maintaining since it is relatively short (on the order of few cm long), thereby enabling long-term polarization stable operation. The length of the highly nonlinear fiber 805 is preferably selected to be less than approximately 20 cm to preserve the coherence of the generated continuum. Other designs, however, are possible. Embodiments of the USCF may be utilized in embodiments of the frequency comb source shown in FIG. 8A and may, in various embodiments, extend the continuum, reduce pump requirements, and/or provide for higher degree of coherence.

The (continuum) output from the highly nonlinear fiber 805 is injected via a splice 806 to a wavelength division multiplexing coupler 807. The coupler 807 directs the long and short wavelength components from the continuum to a long wavelength coupler arm 808 and a short wavelength coupler arm 809 respectively. The long wavelength components are subsequently frequency doubled using exemplary lenses 810, 811, 812, 813, as well as a doubling crystal 814. After frequency doubling the resulting output preferably has a substantially same wavelength as at least part of the short wavelength components traveling in the arm 809. Additional optical elements 815 and 816 can be inserted into the beam paths of the arms 808 and 809 for spectral filtering, optical delay adjustment, as well as polarization control. Spectral filtering elements are selected to maximize the spectral overlap of the signals propagating in arms 808 and 809. As another example, the optical element 815 can comprise appropriate wave-plates that control the polarization state of the light in front of the doubling crystal 814.

The frequency-doubled light from the arm 808 and the light from the arm 809 are subsequently combined in a polarization-maintaining coupler 817 which preferably has a 50/50 splitting ratio. The beat signal from interference of the two beams injected into the coupler 817 is detected by a detector 818.

As shown in FIG. 8A, one selected harmonic of the beat signal at frequency $f_{n,m,beat}$ may be directed via an electrical feedback circuitry 819 to the oscillator 801.

An optical element 816a may be inserted in an optical path after the two arms 808, 809 are combined. The optical elements 816 and 816a that can be inserted into the arm 809 and in the combined signal arm before the detector 818 may comprise a narrow bandpass filter that narrows the spectral width of the signal transmitted through the arm 809.

To produce an optical output of the frequency comb source which is used, for example, for a frequency metrology experiment, part of the frequency comb can be coupled out from a location 818b after the highly nonlinear fiber or from a location 818a after the coupler 817 and interferometer. The optical output can also be coupled out at a location 818d after the oscillator or at a location 818c after the amplifier, if for example only the spectral part of the oscillator or amplifier bandwidth of the comb is desired.

FIG. 8B illustrates one possible embodiment of the oscillator 801 described above in reference to FIG. 8A. The oscillator 801 includes a saturable absorber module 820 comprising collimation and focusing lenses 821 and 822 respectively. The saturable absorber module 820 further comprises a saturable absorber 823 that is preferably mounted onto a first piezo-electric transducer 824. The first piezo-electric transducer 824 can be modulated to control, for example, the repetition rate of the oscillator 801.

The oscillator 801 further comprises an oscillator fiber 825 that is preferably coiled onto a second piezo-electric transducer 826. The second piezo-electric transducer 826 can be modulated for repetition rate control of the oscillator 801. The oscillator fiber 825 is preferably polarization-maintaining and has a positive dispersion although the designs should not be so limited. The dispersion of the oscillator cavity can be compensated by a fiber grating 827 which preferably has a negative dispersion and is also used for output coupling. It will be understood that a positive dispersion fiber grating and a negative dispersion cavity fiber may also be implemented. Furthermore, the fiber grating 827 can be polarization-maintaining or non-polarization-maintaining.

The pump light for the oscillator 801 can be directed via a polarization-maintaining wavelength division multiplexing coupler 828 from a coupler arm 829 attached to a preferably single-mode pump diode 830.

FIGS. 8C-D illustrate some of approaches to using the beat signal frequency to control repetition rate as well as carrier envelope offset frequency of the frequency comb source 800. As shown in FIG. 8C, a pump current 840 can be changed, wherein a change in the pump current can cause a change of the beat signal frequency and more particularly the carrier envelope offset frequency.

As shown in FIGS. 8D and 8E, the absolute position of the carrier envelope offset frequency can be controlled by adjusting the temperature of the fiber grating 827 with a heating element 842. Alternatively, pressure applied to the fiber grating 827 can also be used to set the carrier envelope offset frequency using for example a piezo-electric transducer 844.

FIGS. 8A and 8B describe the basic design of a frequency comb source based on a low noise phase-locked fiber laser for frequency metrology. Modifications to this basic design can be easily implemented as described below.

FIG. 8F illustrates one embodiment of a fiber based continuum source 850 where the amplifier (803 in FIG. 8A) is omitted. In the exemplary continuum source 850, high quality sub-200 fs pulses are preferably injected into a highly non-linear fiber 854 (805 in FIG. 8A). To generate such short pulses, the oscillator-only continuum source 850 preferably generates positively chirped pulses in the oscillator 801, which are compressed in an appropriate length of a negative dispersion fiber 852 before injection into the highly nonlinear fiber 854. For the oscillator-only continuum source 850, the amplifier is thus substituted with the negative dispersion fiber 852.

As shown in FIG. 8F, the oscillator-only continuum source 850 further comprises an interferometer 856 that interferes the two frequency components as described above. The interferometer 856 may be similar to the two-arm interferometer shown in FIG. 8A (fiber based or equivalent bulk optics components), or may be similar to a one-arm interferometer described below. The output of the interferometer 856 can be detected by a detector 858, and selected signals from the detector 858 can be used for feedback control 860 in a manner similar to that described above in reference to FIGS. 8A-E.

FIG. 8G illustrates an example one-arm interferometer 870. Such an interferometer can be obtained by removing one of the arms (arm 809 in FIG. 8A) and modifying the remaining arm. As shown in FIG. 8G, the interferometer 870 comprises a group delay compensator 872 inline with a doubling crystal 874. The group delay compensator 872 receives a continuum signal from a highly nonlinear fiber located upstream, and ensures that the frequency doubled and non-doubled spectral components from the continuum that are output from doubling crystal overlap in time. Moreover, since the doubled and non-doubled spectral components are selected to overlap in optical frequency, these components interfere and the interference signal is detected with a detector downstream.

Highly non-linear fibers corresponding to embodiments of the present disclosure may be utilized for supercontinuum generation and may provide for extremely broad bandwidths. The disclosure of U.S. patent application Ser. No. 11/091,015, entitled "Optical parametric amplification, optical parametric generation, and optical pumping in optical fibers systems," filed Mar. 25, 2005 (hereinafter the '019 application), and published as U.S. Patent Publication 2005/0238070 is hereby incorporated by reference in its entirety. Embodiments may provide a broad spectral bandwidth for continuum or supercontinuum generation. For example, in various embodiments, the bandwidth may be at least about 50 nm, and in some embodiments at least about 200 nm. A spectral bandwidth of up to about 1 μm may be generated with embodiments of highly non-linear USCFs. For example, in some embodiments, supercontinuum from about 0.4 μm to greater than about 1.6 μm may be generated.

FIG. 4 of the '015 application (reproduced herein as FIG. 9) and the corresponding text of the '015 application, for example, describe an embodiment of an amplification system comprising a short-pulse fiber laser 101 whose output is split into two arms by a beam splitter 220. In a one arm is an optical parametric amplification (OPA) pump 200 that provides pump power. The OPA pump 200 outputs high-energy, narrow-bandwidth, pump pulses. In another arm, a broadband continuum is generated in a continuum fiber 210. This continuum fiber 210 may comprise, for example, a fiber having nonlinear properties. Output from the continuum fiber 210 is passed through a filter 240 to filter out twice the center wavelength of the light generated by an OPA pump 200 located in a second arm. The filter 240 may pass long- and/or short-wavelength parts relative to twice the center wavelength of the OPA pump 200. This broadband continuum output comprises a seed pulse for seeding the OPA process.

Accordingly, the output from the continuum fiber 210 after being filtered by the filter 240 as well as the pump output from the OPA pump 200 are combined by a beamsplitter/coupler 250 and applied to the parametric amplifier 260. The beam splitter 250 thus combines high-energy narrow-bandwidth pump pulses from the OPA pump 200 and wide-bandwidth seed pulses from the continuum fiber 210. An amplified signal is produced by the parametric amplifier 260. This amplified signal is applied to the pulse compressor 270.

The fiber laser 101 may be a mode-locked oscillator or a mode-locked oscillator followed by one or more fiber amplifiers. The fiber laser 101 is constructed to deliver pulse energies and peak powers sufficient to produce a wide enough continuum in the continuum fiber 210, e.g., a few nanojoules (nJ). For additional background, see, e.g., U.S. Patent Publication 2004/0213302 entitled "Pulsed Laser Sources" filed by Fermann et al, which is incorporated herein by reference in its entirety. In various embodiments, the fiber laser 101 is an Er fiber laser that produces short optical pulses at about 1560 nm with the repetition rate of 20-100 megahertz (MHz). The laser 101 may produce linearly-polarized light as for example can be obtained by using polarization-maintaining (PM) components. The laser is optionally implemented as a master-oscillator-power-amplifier (MOPA) configuration. Such lasers are described in, e.g., U.S. Patent Application No. 60/519,447, which is incorporated herein by reference in its entirety and available from IMRA America, Ann Arbor Mich.

Figure 9:
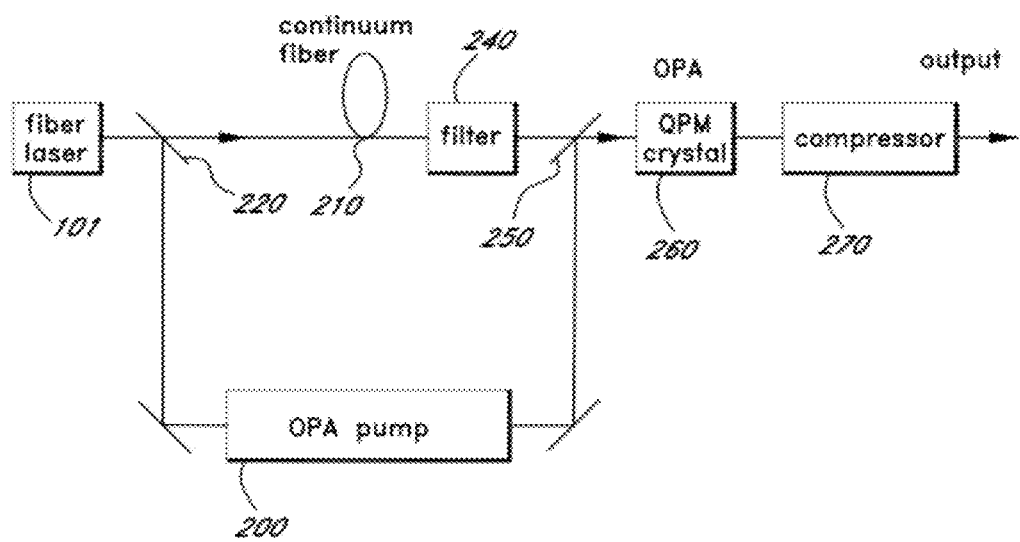
FIG. 9 is an illustration of an embodiment of a compact fiber based source comprising a quasi-phase matched optical parametric amplifier (OPA) that outputs amplified ultra broadband pulses.

In the embodiment schematically illustrated in FIG. 9, the ultra broadband continuum in one arm is generated in the continuum fiber 210, which may comprise a micro-structured fiber and/or a conventional solid-core high-nonlinearity fiber. Optionally, two or more different nonlinear fiber types can be used sequentially as discussed in U.S. Patent Publication 2004/0213302, which is incorporated herein by reference in its entirety. With such an approach, continuum generation can be optimized for different spectral parts, thereby resulting in stable operation over a wide ultra broadband spectrum.

Alternatively, the output from the splitter 220 can be split into two or more arms and different nonlinear fibers or sequences of nonlinear fibers in different arms can be used to optimize the continuum output for each individual arm. The optimization of the continuum output in each arm is particularly useful when creating ultra broadband continua or ultra-flat continua as well as low noise continua. Flat continua are preferred in most applications to reduce or avoid the occurrence of 'spectral holes'. For example, in optical coherence tomography, spectral holes limit the optical resolution. Equally, in spectroscopy, spectral holes limit the signal/noise of a potential detection system in certain parts of the spectrum, which is generally undesired.

Embodiments of the ultra-small core non-linear fibers disclosed herein may be utilized in embodiments of supercontinuum generation systems described in the '015 application, or in variations thereof. Spectral widths of at least several hundred nm may be generated in some embodiments.

The disclosures of U.S. patent application Ser. No. 10/437,059 entitled "Inexpensive variable rep-rate source for high-energy ultrafast lasers," filed May 14, 2003 (hereinafter the '059 application), published as U.S. Patent Application Publication 2004/0240037, and U.S. patent application Ser. No. 10/813,163, entitled "Modular fiber-based chirped pulse amplification system," filed Mar. 31, 2004 (hereinafter the '163 application), and published as U.S. Patent Application Publication 2005/0226286 generally relate to fiber based ultrashort systems. Various embodiments include non-linear amplifiers for amplifying pulses and configurations for pulse stretching and spectral broadening. The disclosures of the '059 application and the '163 application are both incorporated by reference herein in their entirety.

One application of embodiments of USCF is for stretching ultrashort pulses. In some embodiments, it is desirable to stretch ultrashort pulses to a pulse width of about 1 ns prior to amplification. The stretching may be carried out in a fiber gain medium to provide both amplification and spectral broadening, and/or in passive fibers. In certain embodiments, fibers having normal dispersion (group velocity dispersion, GVD) are utilized in combination with self-phase modulation to produce linear chirped and broadened pulses at wavelengths at or near 1 μm.

Figure 10A:
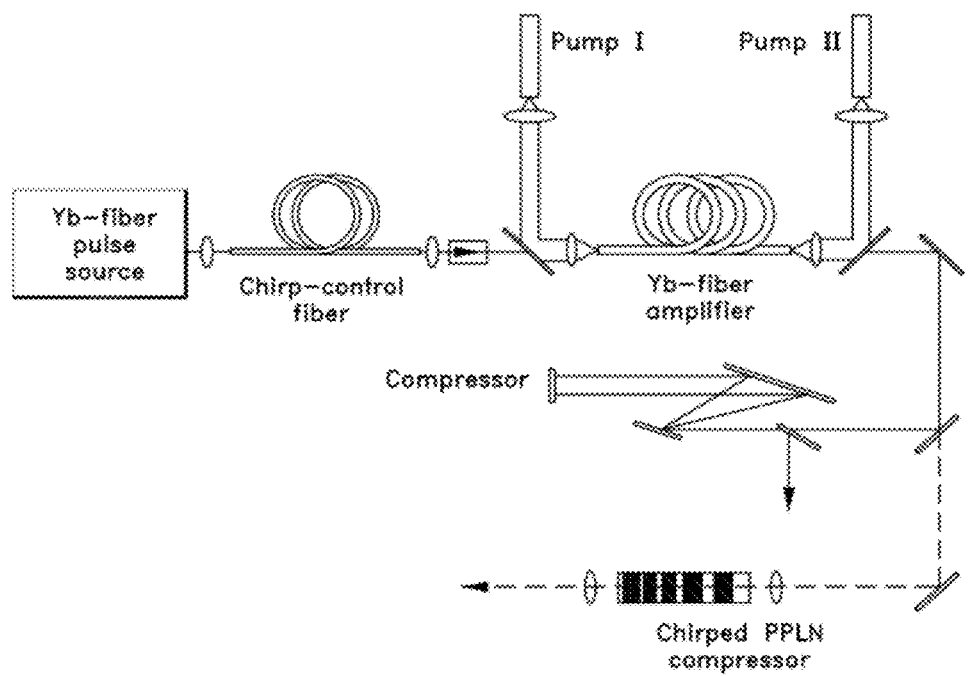
FIG. 10A schematically illustrates an example of a co- and counter-pumped fiber amplifier, which may operate as a non-linear amplifier or power amplifier.
Figure 10B:
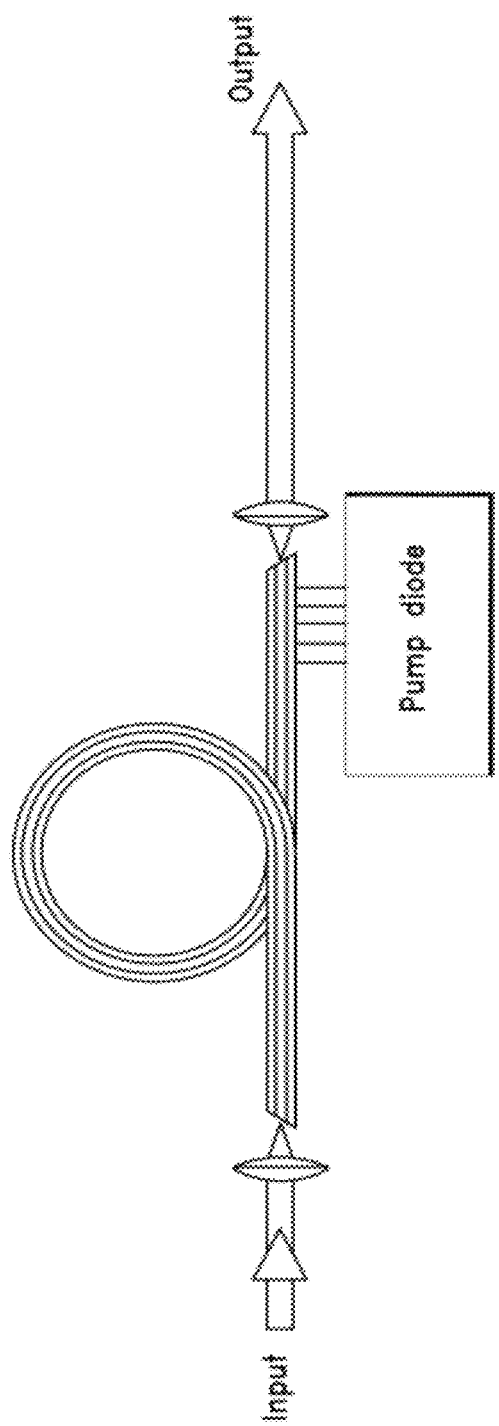
FIG. 10B schematically illustrates an example of a side-pumped fiber amplifier, which may operate as a non-linear amplifier or a power amplifier.
Figure 10C:
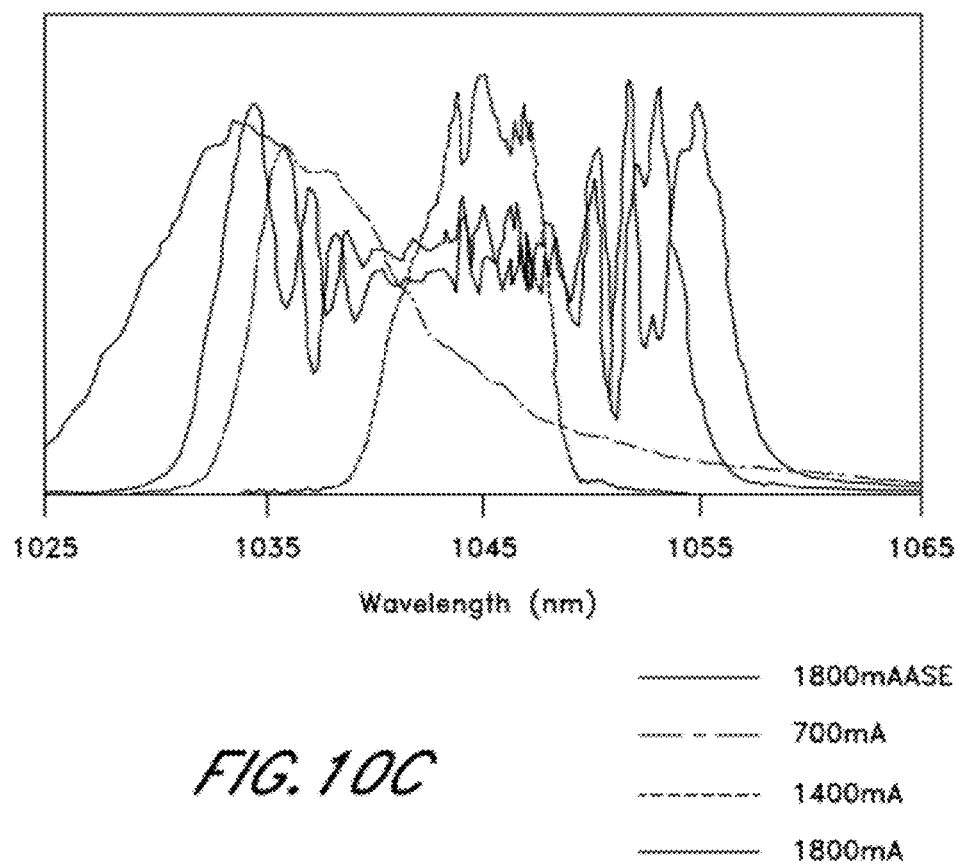
FIG. 10C shows the spectrum from the nonlinear amplifier as a function of pump diode current and ASE spectral output at peak current.
Figure 10D:
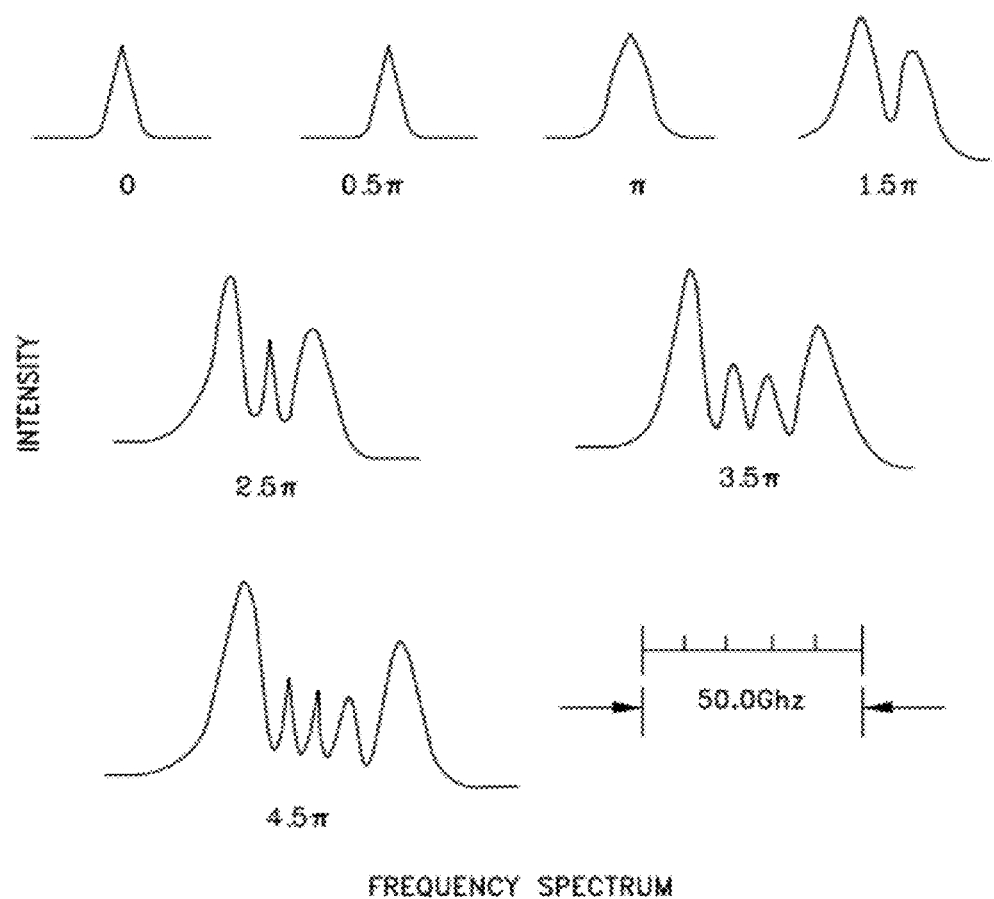
FIG. 10D schematically shows the spectrum of pulses with self-phase modulation propagating in a positive dispersion fiber.

A doped fiber gain medium provides for non-linear amplification. In the '163 application at least one embodiment comprises a non-linear amplifier module. It is nonlinear due to the fact the pulse is not temporally stretched so that the amplification takes place with high intensity and thus significant self-phase modulation. FIGS. 1B and 1C from the '163 application are reproduced herein as FIGS. 10A and 10B. Typical amplifier configurations are shown in FIG. 10A (a co-propagating and counter-propagating pumped arrangement) and FIG. 10B (a side-pumped arrangement), although the precise configuration can be selected from many known amplifier designs. The spectrum at the output of this amplifier is shown in FIG. 6A from the '163 application, which is reproduced herein as FIG. 10C. For higher pump currents the spectral width is over 20 nm. Thus in this nonlinear amplifier the spectral width has been increased by self-phase modulation by more than a factor of 10, from about 2 nm over 10 times to greater than 20 nm. The amplifier is a Yb-doped cladding pumped fiber that is 4 meters long. In FIG. 10B, the amplifier is side-pumped with counterpropagating pumping. Even at the lowest current the spectrum has been broadened by self-phase modulation. At the higher current levels, the spectrum is typical for self-phase modulation propagating in a fiber with positive dispersion. Compare these spectra to that shown in FIG. 7 of the '163 application, which is reproduced from Govind P. Agrawal, Nonlinear Fiber Optics (Academic Press, Inc. New York, 1989), and which is reproduced herein as FIG. 10D.

A nonlinear Yb amplifier with positive dispersion, usable with amplifier embodiments such as those schematically shown in FIGS. 10A and 10B, and which has been utilized for pulse amplification of a substantially unchirped pulse that is significantly spectrally broadened during the amplification and which can be pulse compressed after amplification is disclosed in the '059 application. In such systems, highest gain and efficiency are not the predominant concern as in the case of other amplifiers. The gain of about 100 times in this stage is rather low for a fiber amplifier. One goal is to obtain the highest pulse energy in a pulse that can be compressed.

Embodiments of the USCF disclosed herein may be used to further improve the performance of the above-described ultrashort laser systems, or similar systems.

Also, embodiments of the present disclosure may be utilized in a wide-range of applications wherein one or more of femtosecond, picosecond, nanosecond, and microsecond pulses are directed to a target material. Further possible applications of both non-linear stretchers and non-linear amplifiers (comprising USCF embodiments) are generally found in material processing and micromachining operations. For example, a material processing system may comprise a fiber system, an optical system to direct the pulses to a material, at least one positioning system to position the target material relative to one of more pulses, and a system controller.

A wide variety of other applications, both currently known as well as yet to be discovered, are also possible.

While certain embodiments of the disclosure have been described, these embodiments have been presented by way of example only, and are not intended to limit the scope of the present inventions. A wide variety of alternative configurations are also possible.

For example, components (e.g., layers) may be added, removed, or rearranged. Similarly, processing and method steps may be added, removed, or reordered.

Accordingly, although certain preferred embodiments and examples have been described above, it will be understood by those skilled in the art that the present invention extends beyond the specifically disclosed embodiments to other alternative embodiments and/or uses and obvious modifications and equivalents thereof. In addition, while several variations have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. It should be understood that various features and aspects of the disclosed embodiments can be combined with, or substituted for, one another in order to form varying modes and embodiments. Thus, it is intended that the scope of the present invention herein disclosed should not be limited by the particular disclosed embodiments described above.

What is claimed is:

1. An optical fiber capable of propagating light having a wavelength, the optical fiber comprising:
   a core having a diameter less than about 4 μm;
   a first region at least partially surrounding the core, the first region comprising a plurality of first features collectively having a first filling factor in the first region that is less than about 90 percent; and
   a second region at least partially surrounding the first region, the second region comprising a plurality of second features collectively having a second filling factor in the second region that is greater than about 90 percent,
   wherein the optical fiber has a dispersion tailored to provide a spectral bandwidth of at least about 50 nm in a nonlinear optical device.

2. The optical fiber of claim 1, wherein the core diameter is in a range from about 1 μm to about 4 μm.

3. The optical fiber of claim 1, wherein the first filling factor is greater than about 50%.

4. The optical fiber of claim 1, wherein the first filling factor is less than the second filling factor.

5. The optical fiber of claim 1, further comprising:
   an outer layer surrounding the second region; and
   a plurality of webs mechanically coupling the first region and the outer layer such that the second region is disposed therebetween.

6. The optical fiber of claim 5, wherein the second features comprises air holes.

7. The optical fiber of claim 5, wherein at least one of the plurality of webs is substantially radial and has a radial length and a transverse width, the radial length greater than the transverse width.

8. The optical fiber of claim 1, wherein the spectral bandwidth is at least about 200 nm.

9. The optical fiber of claim 1, wherein the spectral bandwidth is at least about 1 μm.

10. The optical fiber of claim 1, wherein the spectral bandwidth is in a range from about 50 nm to about 1 μm.

11. The optical fiber of claim 1, wherein the optical fiber has a dispersion tailored to provide supercontinuum generation in the nonlinear optical device.

12. The optical fiber of claim 1, wherein the optical fiber is configured to control dispersion of the light and substantially confine the light to the core.

13. The optical fiber of claim 1, wherein at least a portion of the fiber is doped with a gain medium.

14. The optical fiber of claim 13, wherein the fiber is configured to provide non-linear amplification of light propagating in the fiber.

15. The optical fiber of claim 13, wherein the fiber is configured to receive optical pump light to pump the gain medium at a pump wavelength.

16. A frequency comb source comprising the optical fiber of claim 1.

17. A supercontinuum source comprising the optical fiber of claim 1.

18. An optical parametric amplifier system comprising the optical fiber of claim 1.

19. A chirped pulse amplification system configured to produce ultrashort laser pulses, the system comprising at least one of (i) a non-linear fiber amplifier comprising the optical fiber of claim 1, at least a portion of the fiber being doped with a gain medium, or (ii) the optical fiber according claim 1, the optical fiber being undoped.

20. A non-linear fiber optic system configured to produce broadband optical pulses, the system comprising:
   a laser source configured to produce optical pulses having the wavelength;
   the optical fiber of claim 1 optically coupled to the laser source, wherein at least a portion of the optical fiber is doped so as to provide an optical gain medium for non-linear amplification of the optical pulses; and
   an optical pump configured to pump the optical gain medium at a pump wavelength.

* * * * *

UNITED STATES PATENT AND TRADEMARK OFFICE
CERTIFICATE OF CORRECTION

PATENT NO. : 8,467,648 B2  
APPLICATION NO. : 13/448003  
DATED : June 18, 2013  
INVENTOR(S) : Liang Dong et al.

Page 1 of 1

It is certified that error appears in the above-identified patent and that said Letters Patent is hereby corrected as shown below:

In the Specification:

In column 9 at line 53, change "3201)" to --3201--.

In column 11 at line 36, change "125" to --125 μm.--.

In the Claims:

In column 18 at line 38, in Claim 19, change "according claim" to --according to claim--.

Signed and Sealed this  
Fifth Day of November, 2013

Teresa Stanek Rea  
*Deputy Director of the United States Patent and Trademark Office*